(12) United States Patent
Meyer (10) Patent No.: US 8,477,680 B2
(45) Date of Patent: Jul. 2, 2013

(54) DEMODULATOR FOR HIGH BIT RATE TRANSMISSION AND CORRESPONDING DEMODULATION METHOD

(75) Inventor: Jacques Meyer, Saint-Martin-le-Vignoux (FR)

(73) Assignee: STMicroelectronics (Grenoble) SAS, Grenoble (FR)

( * ) Notice: Subject to any disclaimer, the term of this patent is extended or adjusted under 35 U.S.C. 154(b) by 238 days.

(21) Appl. No.: 13/108,623

(22) Filed: May 16, 2011

(65) Prior Publication Data

US 2011/0286383 A1  Nov. 24, 2011

(30) Foreign Application Priority Data

May 18, 2010 (FR) .................................. 10 53820

(51) Int. Cl.
 *H04B 7/185* (2006.01)
 *H04B 7/204* (2006.01)
(52) U.S. Cl.
 USPC .......................................... 370/316; 370/319
(58) Field of Classification Search
 USPC .................................................. 370/316, 319
 See application file for complete search history.

(56) References Cited

U.S. PATENT DOCUMENTS

| 3,818,453 A | 6/1974 | Schmidt et al. |
| 6,104,762 A * | 8/2000 | Fujimura ...................... 375/324 |
| 6,480,236 B1 | 11/2002 | Limberg |
| 6,624,766 B1 | 9/2003 | Possley et al. |
| 6,822,953 B1 * | 11/2004 | Schaefer et al. .............. 370/344 |
| 2006/0126491 A1 * | 6/2006 | Ro et al. ........................ 370/208 |

FOREIGN PATENT DOCUMENTS

EP  1 107 599 A2  6/2001

OTHER PUBLICATIONS

République Française Institut National de la Propriete Industrielle, Rapport de Recherche Préliminaire (Preliminary Search Report); issued in French Patent Application No. 1053820 on Feb. 25, 2011 (2 pages).

Yim, W.H., et al., "On-Board Processing for KA-Band Applications," Satellite Communications—ECSC-3, 3$^{rd}$ European Conference on Manchester, UK, London, Jan. 1, 1993, pp. 225-229.

* cited by examiner

*Primary Examiner* — Kenny Lin
(74) *Attorney, Agent, or Firm* — Slater & Matsil L.L.P.

(57) ABSTRACT

Processing method for modulated data transmitted in the form of multiplexed frames (Frame 1, ... Frame 10) containing symbols that have a symbol frequency. The method comprises a frame selection processing operation performed at least partly at a working frequency below the symbol frequency, and a demodulation processing operation comprising at least a part performed at the working frequency on the selected frames.

19 Claims, 8 Drawing Sheets

DEMODULATOR FOR HIGH BIT RATE TRANSMISSION AND CORRESPONDING DEMODULATION METHOD

This application claims the priority benefit of French patent application Ser. No. 10/53820, filed on May 18, 2010, entitled "Demodulator for High Bit Rate Transmission and Corresponding Demodulation Method," which application is hereby incorporated herein by reference to the maximum extent allowable by law.

TECHNICAL FIELD

The invention relates to the real-time or "continuous" processing of data and more particularly the demodulation of modulated data, notably when these data are multiplexed and only some of the data is of use to the receiver. The invention applies advantageously but in a nonlimiting manner to satellite communications and, more generally, to any high bit rate communication using time-division and/or frequency-division multiplexing.

BACKGROUND

Satellite communications at the present time use conventional channels for which the frequency bands have typical widths less than 60 MHz. New satellite transponders make it possible to have high bit rate channels with wide bandwidths, typically 500 MHz in the Ka band. To use such a bandwidth, there is a prior-art solution, which consists of frequency multiplexing several conventional channels, for example 8. That said, this solution, because of the nonlinearity of the power units, involves intermodulation. To avoid such intermodulation, the sending power of the transponder is reduced. Such a reduction lowers the signal-to-noise ratio on reception and therefore the bit rate.

To avoid this intermodulation, while retaining a maximum sending power, it is proposed, according to another known solution, to time-division multiplex the conventional channels which will then be transmitted in a single high bit rate channel. This high bit rate channel has a higher symbol frequency and also occupies a greater bandwidth. Thus, it is possible, with conventional 60 MHz channels, to occupy a greater bandwidth, for example 500 MHz.

To produce the time-division multiplexing of the conventional channels, one solution provides for the use of symbol frames called PLFRAME (Physical Layer Frames) standardised by the DVB-S2 standard. These are consecutive symbol frames protected by an error-correcting code. These frames all have the same symbol frequency (the inverse of the duration of a symbol) but are sufficiently independent for each to have a different length, modulation and protection rate. The composition of each of the frames is indicated by a header or 90 symbols modulated by a QPSK modulation.

To demodulate a high bit rate channel whose symbol frequency is very high, such as that resulting from the above mentioned time-division multiplexing, one known solution consists of performing the demodulation calculations in parallel. The useful frames are then selected by demultiplexing after this demodulation. However, this solution is not optimal, because it amounts to using computational power on data that will not all be used. The useful data have, de facto, a bit rate well below that of the demodulation. Also, this solution is very difficult to implement because some of the demodulation operations use loops with low time constants, which requires the availability of the symbols immediately preceding the current symbol. This is not compatible with parallel operation. The many calculations involved in these operations must therefore be performed at a frequency corresponding to the number of operations. This is not always possible because a working frequency of the order of several times the symbol frequency would then be necessary. Thus, for the DFE (Decision Feedback Equalizer, a term well known to those skilled in the art), it is necessary, during a symbol time, to perform a subtraction, make a decision (determine the symbol of the constellation that is closest to the received symbol), and perform a multiplication and at least one addition.

SUMMARY OF THE INVENTION

In one aspect, the present invention provides for a method for real-time processing of modulated data transmitted in the form of multiplexed frames containing symbols that have a symbol frequency. The method comprises a frame selection processing operation performed at least partly at a working frequency below the symbol frequency, and a demodulation processing operation at least in part performed at the working frequency on the selected frames.

In another aspect, the present invention provides for a communication appliance, capable of processing in real time, modulated data transmitted in the form of multiplexed frames containing symbols that have a symbol frequency. The applicant includes a subsystem for processing the symbol frames, said subsystem including a selector configured to select, at least partly at a working frequency below the symbol frequency, some of the received frames, and a demodulator configured to perform at least a part of a demodulation processing operation at the working frequency on the selected frames.

BRIEF DESCRIPTION OF THE DRAWINGS

Other advantages and features of the invention will become apparent from studying the detailed description of implementations and embodiments which are in no way limiting, and the appended drawings, in which.

DETAILED DESCRIPTION OF ILLUSTRATIVE EMBODIMENTS

Before discussing the illustrated embodiments in detail, a general discussion of the various embodiments and advantageous features thereof is provided. According to one implementation and embodiment, there is proposed a data processing method which is simple and which can easily be performed in line with the DVB-S2 standard. According to another implementation and embodiment, there is proposed a processing method that saves in computational power and allows for a reasonable complexity of the demodulator.

According to one aspect, there is proposed a real-time processing method for modulated data transmitted in the form of multiplexed frames containing symbols that have a symbol frequency. According to a general characteristic of this aspect, the method comprises a frame selection processing operation performed at least partly at a working frequency below the symbol frequency, and a demodulation processing operation comprising at least a part performed at the working frequency on the selected frames.

Thus, the demodulation operations do not need to be performed at a very high frequency, i.e. above the symbol frequency, using loops with low time constants and which cannot be performed in parallel. The fact that a part of the demodulation processing operation is performed at a frequency below the symbol frequency is transparent to the user. The user will not observe any loss of bit rate because the part of the demodulation performed at the working frequency is advantageously a demodulation processing operation performed on selected frames. In other words, the module configured to execute this demodulation process, at a working frequency below the symbol frequency, an amount of data that is equally reduced.

There are a number of possible variants for implementing a demodulation processing operation comprising at least a part performed at the working frequency on the selected frames.

Thus, according to a first variant, the samples of the sampled frames are worked on and certain frames will be selected to be completely read and demodulated at the working frequency. According to this variant, it is therefore all of the demodulation processing operation which is performed at the working frequency as a priority on the selected frames.

According to a second variant, more optimized in terms of memory, the symbols of the frames are worked on. A high bit rate predemodulation of the samples of the frames will notably be performed so as to obtain the symbols, then the desired frames will be selected and the final demodulation processing operation will be performed at a working frequency as a priority on these selected frames. According to this second variant, the final demodulation processing operation is performed at the working frequency. The other processing operations may be performed at various frequencies, all below or equal to the sampling frequency.

The final demodulation processing operation in fact includes so-called critical operations, that is to say, operations that require a large number of operations per symbol and that use loops with very low time constants and which cannot be performed in parallel. According to this second variant of the invention, the final demodulation operations will be performed at a working frequency below the symbol frequency by virtue of a selection.

The non-critical predemodulation operations will possibly be performed at the sampling frequency, or at a frequency below the sampling frequency, in particular the working frequency, for example by performing these operations in parallel. In the case of parallel operation, the frequency at which these predemodulation operations are performed will be, for example, a submultiple of the sampling frequency.

Thus, according to the first variant, all the sampled symbol frames are stored at a frequency below or equal to the sampling frequency (the samples of the frames are stored). Then, a demodulation processing operation is performed on data selected from the data stored in memory. This demodulation processing operation is advantageously performed at a working frequency below the symbol frequency. For this, all the demodulation operations are not performed on all the data but as a priority on the useful data. For example, all the operations are performed on one frame in every n frames, n being a predetermined number. This selection avoids demodulation operations that cannot be performed in parallel at a very high frequency, as specified previously.

In other words, according to this first variant, a frame comprises symbols sampled at a sampling frequency, and the selection processing operation comprises:

storage of all the samples of all the frames in a memory;

reading, at the working frequency, the headers of all the frames so as to obtain said frames to be selected;

reading, at the working frequency, the frames selected and stored, and said demodulation processing operation is implemented at the working frequency on the frames read.

The memory thus acts as a brake so that a high bit rate stream, whose frequency corresponds to the sampling frequency, can be demodulated at low bit rate, that is to say at the working frequency.

According to one implementation of this first variant, the readings of the headers and of the selected frames comprise reading a predetermined number of samples preceding the frames and headers to be read. In this way, the reading of the header is simpler and more accurate since the demodulation loops have already been able to be initialised.

According to another implementation of this first variant, the readings of the headers and of the selected frames comprise address jumps in said memory. According to another implementation of this first variant, the header reading step comprises, for each symbol of the header, a determination of an optimum instant using a phase locked loop and a digitally-controlled oscillator, said determination step comprising for each address jump a summing, at a frequency set point accumulated by the digitally-controlled oscillator, of the number of samples corresponding to the address jump expressed as a number of symbols.

After each address jump, the determination of the symbol corresponding to the samples by the interpolating filter is thus more accurate. This accuracy makes it possible to read and process the headers rapidly without error.

According to the second variant, a selection is made on the predemodulated frames and at least the selected frames are stored. The memory capacity is of the order of the largest expected symbol frame. It is therefore smaller because these are symbols and no longer samples that are stored.

In other words, according to this second variant, a frame comprises symbols sampled at a sampling frequency and the demodulation of such a frame comprises a predemodulation processing operation comprising a determination of the symbols based on the samples and a final demodulation processing operation performed on the symbols and comprising, for example, an error correcting processing operation and phase equalisation and correction processing operations, and said selection processing operation comprises:

the implementation of the predemodulation processing operation on all the frames;

a determination at the working frequency of the predemodulated frames to be selected from their header; and storage of at least the selected predemodulated frames in a memory at a storage frequency below the symbol frequency, and said demodulation processing operation comprises the implementation at the working frequency of the final demodulation processing operation on the selected predemodulated frames.

The demodulation operations are performed as a priority on the selected frames. It is thus possible to perform critical operations at a reasonable frequency, that is to say, below the symbol frequency.

Storage of the symbols of the frames at a frequency below the symbol frequency is also possible because a number of symbols can be written simultaneously. The storage frequency reduces as the number of symbols written on each storage increases. It is thus possible to use a memory whose minimum capacity is reduced compared to the first variant. In practice, it is no longer frames comprising sampled symbols that are stored but directly frames comprising symbols. As an example, if four samples are used for each symbol, storing a symbol frame requires four times less space than that of a sample frame. Thus, the size of the memory is of the order of the largest expected symbol frame. The memory in this case also acts as a brake so that a high bit rate stream, at the symbol bit rate, can be demodulated at low bit rate. that is to say, at the working frequency.

According to one implementation of the second variant, the step for determination of the frames to be selected comprises reading the headers of all the frames at the working frequency. Only the headers of the frames are read, whereas the unwanted frames are not read. This processing operation can therefore be performed at the working frequency when the stream is at the symbol frequency.

Figure 8:
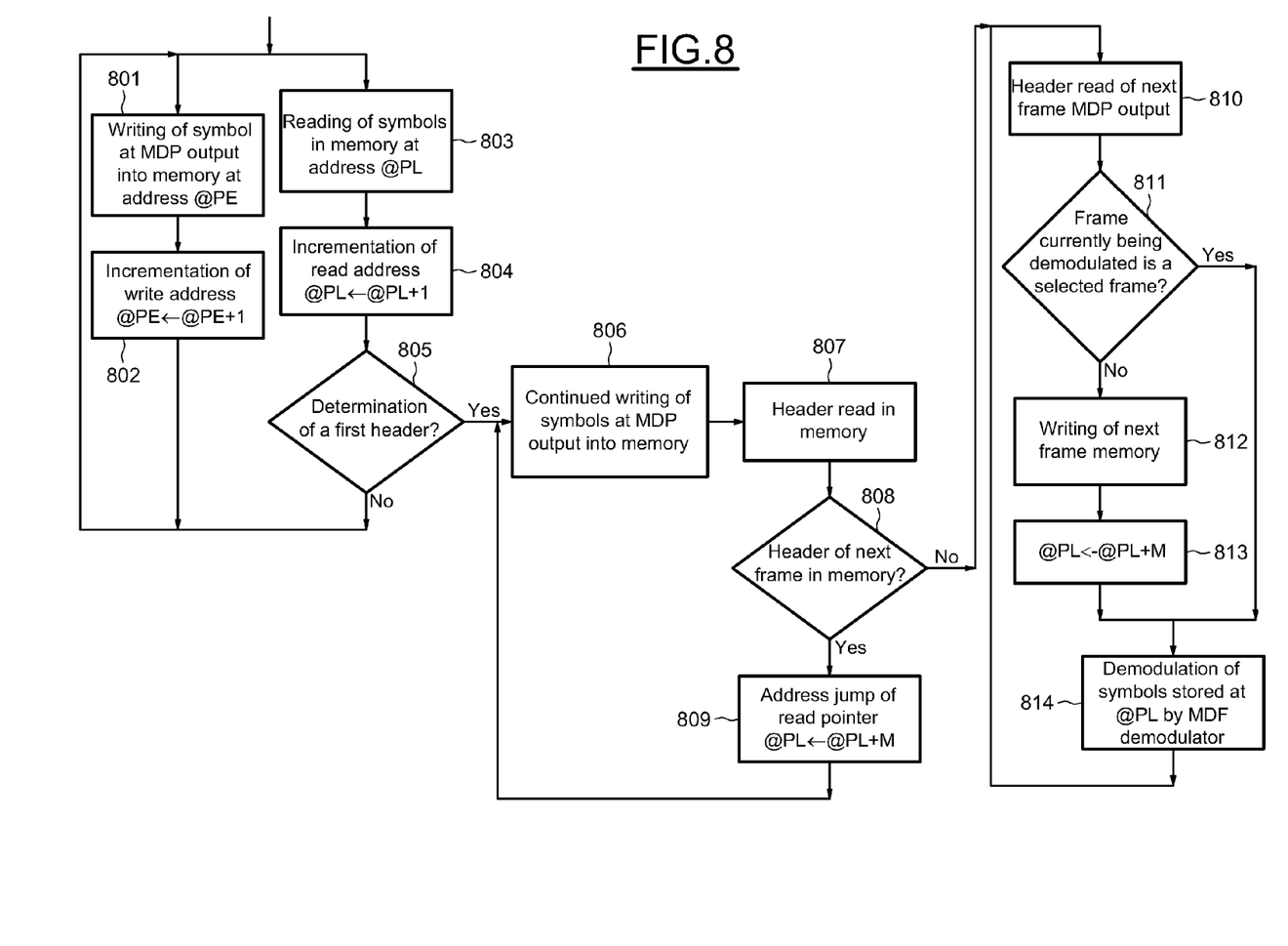
FIG. 8 schematically illustrates the operation of the header processor, according to the second variant of the invention.

According to another implementation of this second variant, until a first header read has been performed, all the predemodulated frames are stored (801) in the memory at a frequency below the symbol frequency and the memory is read (803) from a random address. By resetting the read address to a random position, in the case of a combination of frames having the same length, a position where there is no header is thus avoided.

The demodulation of the frames at the working frequency is performed as a priority on the selected frames. This said, wherever possible (if the demodulation processor has free computation time), according to another implementation of the first or second variant, the method also comprises a demodulation of a part of at least some of the unselected frames. This demodulation is called "dummy". It allows for a faster convergence of the demodulation loops that have already been able to be initialised before receiving the data to be processed.

According to an additional implementation, the memory, in the first or second variant, is managed circularly. Since the stored data are overwritten after they have been read, it is possible to use a smaller capacity memory.

According to another implementation of the second variant, the storage of the selected frames comprises a continuous storage of all the symbols of the predemodulated frames and inhibiting said storage each time the final demodulation processing operation is performed on a selected predemodulated frame.

According to another aspect, a communication appliance is proposed that is capable of processing in real time modulated data transmitted in the form of multiplexed frames containing symbols that have a symbol frequency, comprising a subsystem for processing the frames.

According to a general characteristic of this aspect, said subsystem comprises selection means configured to select, at least partly at a working frequency below the symbol frequency, some of the received frames, and demodulation means configured to perform at least a part of a demodulation processing operation at the working frequency on the selected frames.

According to a first variant, a frame comprises symbols sampled at a sampling frequency, the selection means comprise:
a memory configured to store all the sampled frames,
a header processor configured to read, at the working frequency, the headers of all the frames so as to obtain said frames to be selected, and
the demodulation means comprise a demodulation module configured to read the selected frames in the memory at the working frequency and also configured to perform a demodulation processing operation at the working frequency on the frames read.

According to one embodiment of this first variant, the header processor and the demodulation module are configured to read a predetermined number of samples preceding the frames and headers to be read.

According to another embodiment of this first variant, the header processor and the demodulation module are configured to control the memory read pointer so as to perform address jumps in the memory.

According to an additional embodiment of this first variant, the demodulation module comprises a phase locked loop with a digitally-controlled oscillator and an adder configured to add, for each address jump, at a frequency set point accumulated by the digitally-controlled oscillator, a number equal to the number of samples corresponding to the address jump expressed as a number of symbols.

According to a second variant, a frame comprises symbols sampled at a sampling frequency, the demodulation means comprise a predemodulation module configured to perform, on all the frames, a predemodulation processing operation comprising a determination of the symbols from the samples and the selection means comprise:
a header processor configured to determine at the working frequency the predemodulated frames to be selected from their header, and
a memory configured to store, at a storage frequency below the symbol frequency, at least the selected predemodulated frames, and
the demodulation means also comprise
a final demodulation module configured to perform, at the working frequency, on the stored frames, a final demodulation processing operation.

According to one embodiment of this second variant, the header processor is configured to read the headers of all the frames at the working frequency.

According to an additional embodiment of this second variant, the header processor is configured to store in the memory, at a storage frequency below the symbol frequency, all the predemodulated frames and to read the memory at the working frequency from a random address until a first header has been read.

According to one embodiment, the demodulation means are also configured to perform a demodulation of a part of at least some of the unselected frames. According to one embodiment, the memory is a memory with circular management.

Figure 1:
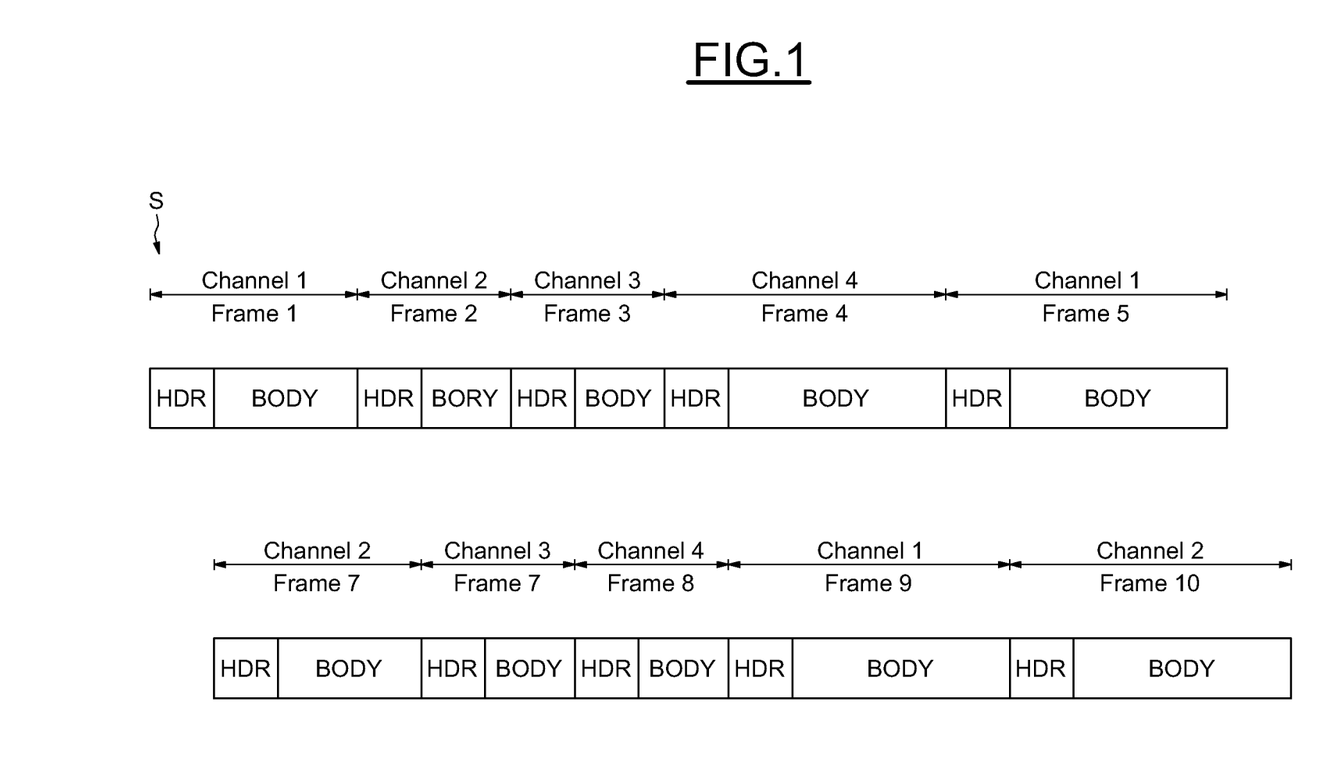
FIG. 1 schematically illustrates a signal S comprising a series of consecutive frames which will be processed by an exemplary demodulator according to the invention.

FIG. 1 schematically illustrates a signal S received by a demodulator according to one aspect of the invention. The signal S comprises a train of consecutive frames of modulated data. Each of the frames comprises a header HDR and a body BODY. The header and the body of the frame comprise symbols. The symbols of the header give information on the content of the body of the frame. In the signal S, the duration of each of the symbols is predetermined and known to the demodulator. It corresponds to 1/FSYMBOL, with FSYMBOL being the symbol frequency. The symbol frequency is therefore equal to the inverse of the symbol duration.

As an example, the frames of the signal S are of DVB-S2 type. The header then contains 90 QPSK symbols. It gives information on the QPSK, 8PSK, 16APSK or 32APSK (acronyms well known to those skilled in the art) modulation format of the symbols contained in the frame body BODY. The header also gives information on the number of symbols in the frame body (from 3330 to 33282 symbols). This makes it possible to deduce the position of the header of the next frame.

The signal S represented in FIG. 1 comprises ten frames. It is the result of a multiplexing of a certain number of different signals. As an exemplary implementation, the signal S is the result of the multiplexing of the conventional channels intended for satellite communications. In this case, each of the frames corresponds to a conventional channel. As an exemplary implementation, the signal S is the result of the multiplexing of 4 PSK signals at a symbol rate of 220 Mbauds/s. Thus, the frame 1 corresponds to the first multiplexed channel, the frame 2 to the second channel, and so on until the frame 5 which corresponds once again to the first channel.

The signal S comprises symbols which have a QPSK, 8PSK, 16APSK or 32APSK modulation format. Each of its symbols therefore comprises a part I, for "in phase", a term well known to those skilled in the art, and a part Q for "quadrature phase", another term well known to those skilled in the art.

Figure 2:
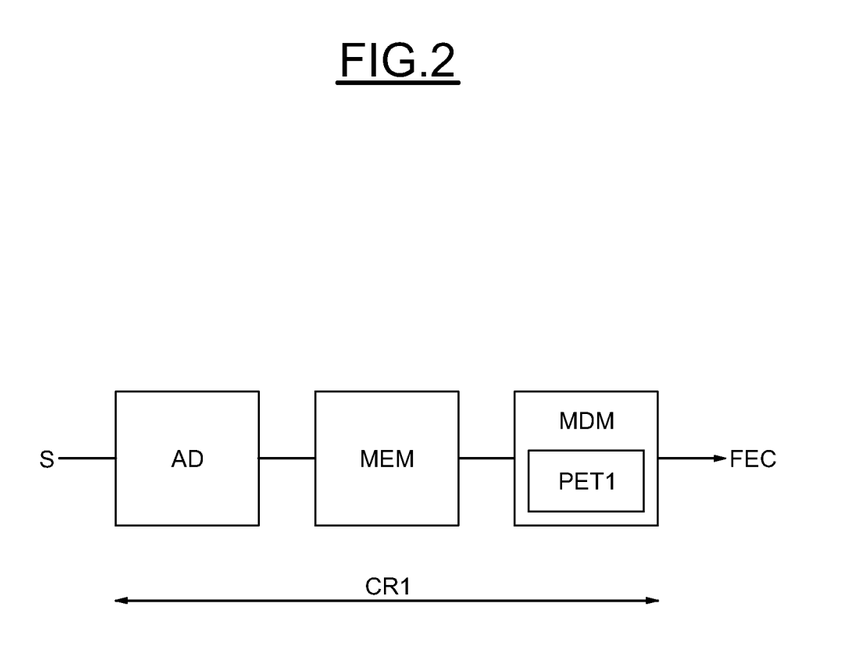
FIG. 2 schematically illustrates a processing subsystem of a demodulator for the signal S, according to a first variant of the invention.

FIG. 2 represents a part CR1 of the processing subsystem of a demodulator according to a first variant of the invention. The demodulator is capable of processing the signal S. Out of the frames of the signal S, only a part of the frames is of use. As an example, the useful frames are those which correspond to a predetermined channel. The processing subsystem according to the invention allows for this selection. It comprises a sampler, AD, a memory, MEM, a demodulation module MDEM and a header processor PET1.

The sampler AD is used to sample the received signal S at a sampling frequency FADC which is, for example, equal to three times the symbol frequency, FSYMBOL, i.e. 660 MHz. Other frequencies can also be chosen, for example a sampling frequency of 800 MHz for a symbol frequency of 150 to 400 MBaud/s. As an exemplary implementation, 8 bits are used to digitize the part I of the symbol and 8 bits are used to digitize the part Q of the symbol.

The memory MEM is a memory in which all the symbol frames are stored after their sampling. In other words, each of the samples of each symbol of each frame must be saved in the memory at the sampling frequency. Advantageously, it is also possible to simultaneously write several consecutive samples in order to reduce the memory storage frequency. For example, if K samples (K being a predetermined integer value) are written at a time, then the writing frequency is equal to the sampling frequency divided by K. It is, nevertheless, necessary to store with a bit rate equal to that of the samples to be able to write all the samples.

The sampled frames to be read and to be demodulated are selected at a working frequency by selection means. These selection means comprise the memory MEM and a header processor PET1.

The header processor reads the headers of all the frames in the memory at a reading frequency, this frequency corresponding to the working frequency of the demodulator. The header processor then determines whether the frame is to be selected. If such is the case, the frame is read by the header processor. The operation of the header processor PET1 is now described in more detail with reference to FIG. 3.

Figure 3:
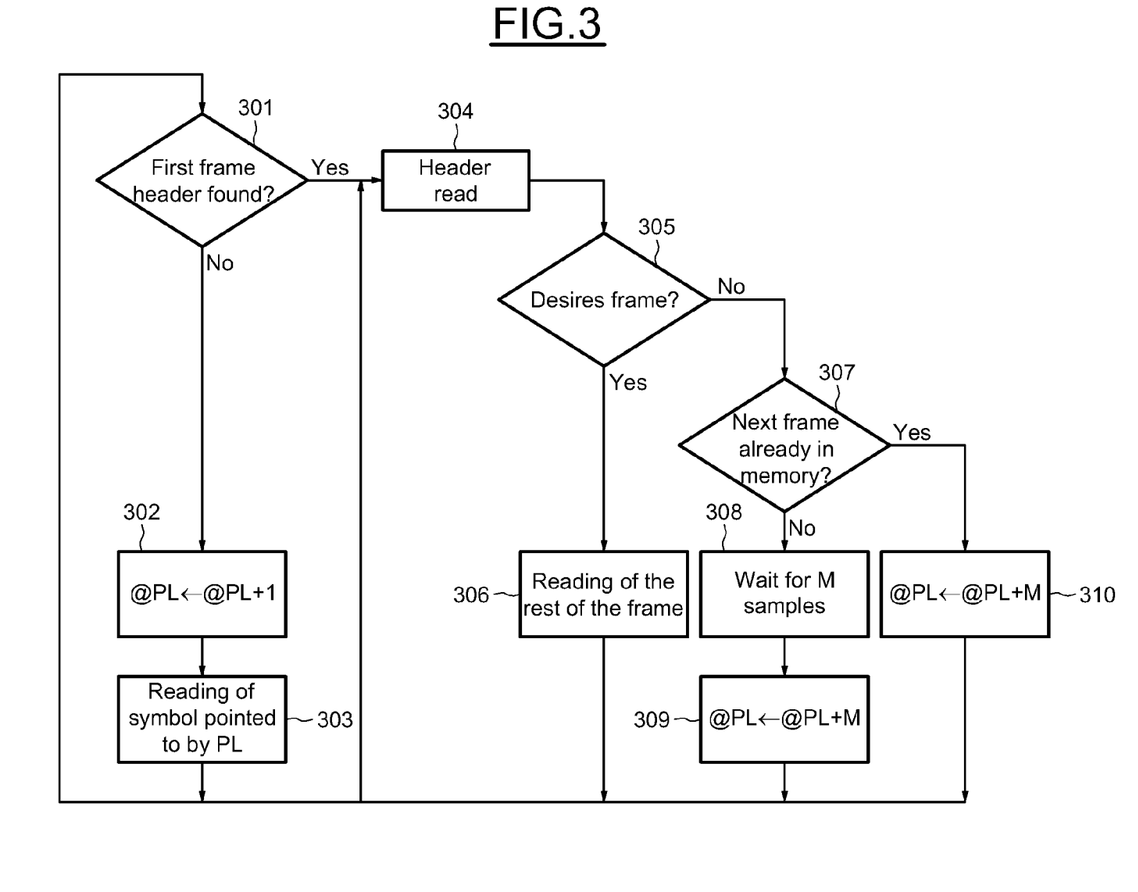
FIG. 3 schematically illustrates the operation of the header processor, according to the first variant of the invention.

The samples of all the frames currently being processed are saved in the memory MEM. The memory MEM is then read by the header processor PET1 according to a read pointer PL pointing to an address @PL. The read pointer is controlled by the header processor PET1.

Firstly, the header processor searches (301) for a first header. Whether or not this header corresponds to a wanted frame is unimportant. For this, the header processor reads the data in the memory in the form of symbols by virtue of a demodulation which may be provided by the demodulation module MDM. As an example, the header processor may analyze the last 90 symbols read to determine a header. The reading of each of the symbols continues until the header processor finds (302, 303) a header.

Then, when the header processor determines a first header, this header is decoded (304). The header processor then determines the length of the corresponding frame. With the length of the frame, the header processor can determine the position in the memory of the next frame and header.

Then, the header processor determines (305) whether the corresponding frame must be read as a priority or not. For this, after having determined a first wanted frame, the header processor uses a frame counter and counts a number of frames before considering the current frame to be wanted. As an example, after having determined a first wanted frame, the header processor uses a frame counter which counts a number of frames before selecting the current frame. As an example, in the case of a frame multiplexing corresponding to four conventional channels of which only one of the four channels must be demodulated, one frame out of four is selected (N=4). When the counter of the header processor counts three frames after the last selected frame, the header processor selects the frame.

The determination of the first frame to be selected is advantageously performed in a so-called "error test mode". More specifically, a first frame chosen at random is selected. All of the processing operations are then performed on this frame. If, thereafter, when reading useful data, it considers that the selected frame is not a wanted frame, then the next frame is selected.

In the case where the frame is a selected frame, it must be read as a priority. After the reading of the header, the reading (306) of the frame therefore continues until the new header.

In the case where the frame is not selected, it must not be read as a priority. A read is nevertheless possible in the case of the use of a so-called "dummy" demodulation detailed hereinbelow. An address jump for the memory read pointer may be performed in order to be placed just before the new frame. As an example, the read pointer is placed at an address number corresponding to a few hundred symbols before the new frame. Because of this the header read is simpler and more accurate since the demodulation loops have already been able to be initialised.

There are two possible ways of performing this address jump depending on whether or not the next header is already written in memory (307). In the case where the next header is already stored in the memory, an address jump (310) to the start of the next frame, that is to say, to the next header, is performed. The address jump value M is determined by the reading of the header by the header processor, a frame length indication being included in the header.

In the case where the next header is not yet written into the memory, a wait (308) is necessary before the address jump. The duration of this wait must be greater than the time needed to write the number of symbols separating the current write pointer from the predicted position of the next frame header. The prediction is made by virtue of the reading of the header which contains a frame length indication. Given that the position of the read pointer is below that of the write pointer, a wait for a number of symbols corresponding to the number of symbols separating the read pointer from the next header is sufficient.

Advantageously, during this wait, a demodulation and a read of a part of at least some of the unselected frames may be performed by the demodulation module MDM. These operations are not a priority, they are performed on the unselected frames by the demodulation module MDM when this module is not in the process of demodulating selected frames.

The demodulation performed on the unselected frames is called "dummy" in the sense that the unselected frame will not be processed by the modules of the higher layers, notably the error correction module FEC. It allows for a faster convergence of the loops within the demodulator, because this way they have already been initialised.

Finally, after this wait, an address jump (309) equivalent to that described hereinabove is performed.

The demodulation operations referred to previously will now be described. The demodulation module MDM conventionally performs, at the working frequency, a demodulation processing operation comprising all or some of the following demodulation operations on the frames read:
  recovery of the carrier, rough compensation of the carrier frequency;
  continuous offset compensation of the samplers or analogue-digital converters (ADC);
  quadrature compensation;
  balancing equalisation of the gains I and Q;
  change of sampling frequency to extract the symbols;
  temporal interpolation of the samples;
  nyquist filtering which may be combined with the interpolation filter;
  calculation of the sampling error;
  sampling loop;
  gain loop in the band corresponding to the desired channel;
  phase loop, phase recovery;
  equalisation; and
  decoding and demapping of the symbols (calculation of the probabilities of presence of each bit).

The demodulation module MDM also performs an operation to determine the optimum instant from the samples of each symbol. This time is used subsequently to weight the various samples and deduce the corresponding symbol therefrom. According to the invention, the operation to determine the optimum instant from the samples of each symbol is enhanced, and is now described with reference to FIG. 4.

Figure 4:
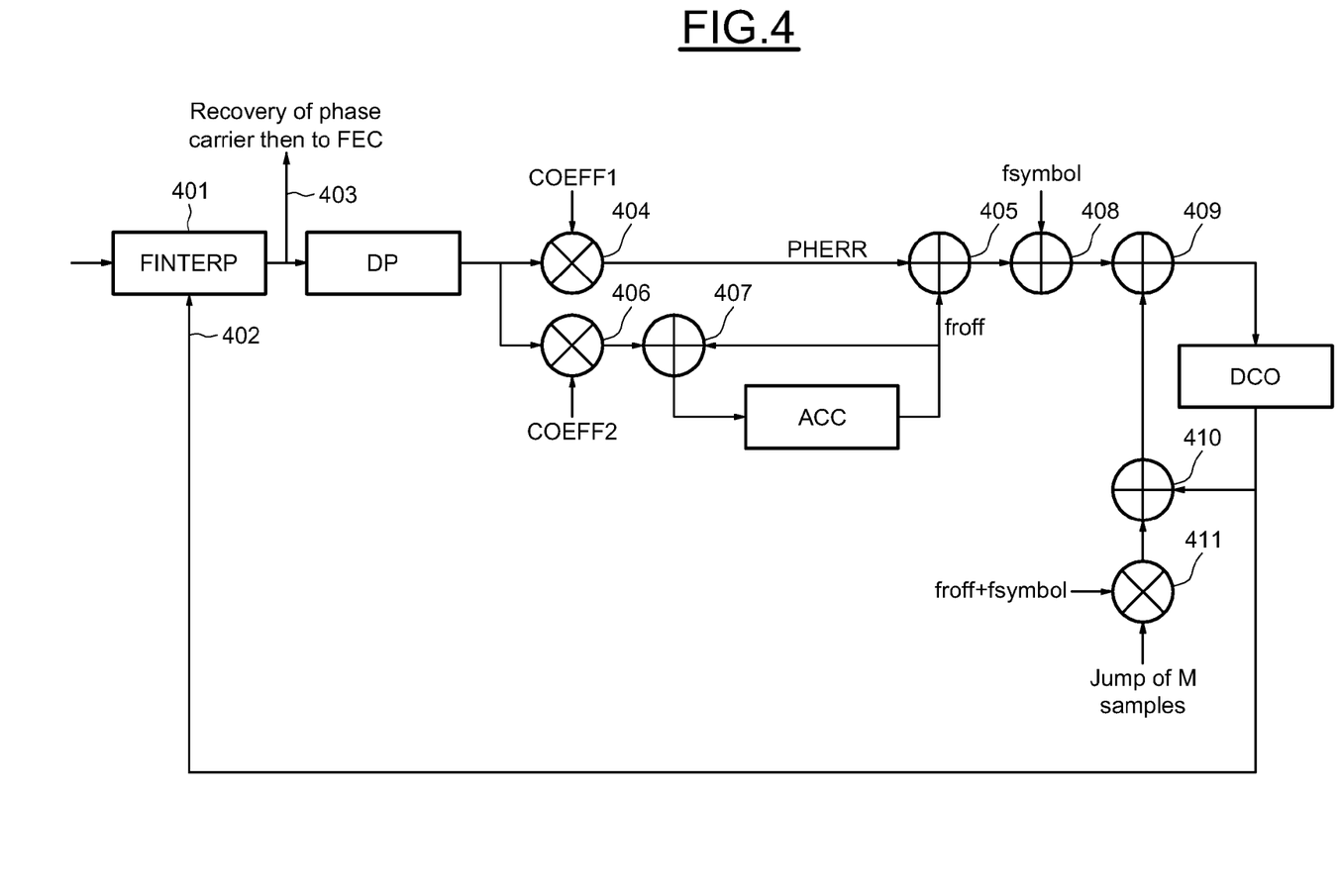
FIG. 4 schematically illustrates an enhancement of the optimum time recovery loop according to the first variant of the invention.

This optimum instant is used to perform an interpolation on the samples belonging to one and the same symbol so as to determine the corresponding symbol. As an example, the criterion of choice for this instant is that of the instant of maximum aperture of the eye diagram.

The interpolating filter FINTERP (401) uses an indication (402) relating to an optimum instant to determine the symbol corresponding to the samples.

Based on these symbols, two processing operations are performed, namely the determination of an optimum instant which is performed by the remaining modules of the figure and the phase recovery and continuing demodulation processing operation (403).

The phase detector DP is used to determine a difference between the expected phase and the received phase of the symbols. There emerges a symbol sampling phase advance or delay value which undergoes two parallel processing operations.

According to a first processing operation, a multiplication (404) by a coefficient COEFF1 is applied PHERR to this value.

According to a second processing operation, the advance or the delay after multiplication (406) by a coefficient COEFF2 is accumulated in an accumulator ACC as the loops progress. This makes it possible to link the advance or delay value to a frequency difference or frequency offset froff between the expected nominal symbol frequency fsymbol and the received symbol frequency, all these frequencies being expressed as a relative value relative to the sampling frequency FADC.

The two values PHERR and froff are then added together (405) and (408) to the nominal symbol frequency fsymbol.

It is this value which corresponds to a frequency set point which is sent to the input of the DCO (digitally controlled oscillator). The DCO accumulates these values and extracts a decimal part therefrom which corresponds to a sampling phase. This phase value is looped back (409) to be used when processing the frequency set point of the following symbol. It is also transmitted to the interpolating filter, it corresponds to the indication (402) relating to an optimum instant. According to one embodiment (not represented), the integer part which has been eliminated can also be retained and accumulated to determine the symbol currently being processed.

The value output from the DCO also has added to it (410), according to the invention, the number of symbols jumped by address jump multiplied (411) by the offset frequency and the nominal symbol frequency. In other words, the number of symbols jumped expressed as a number of samples is added to an accumulated frequency set point value modulo 1.

Figure 5:
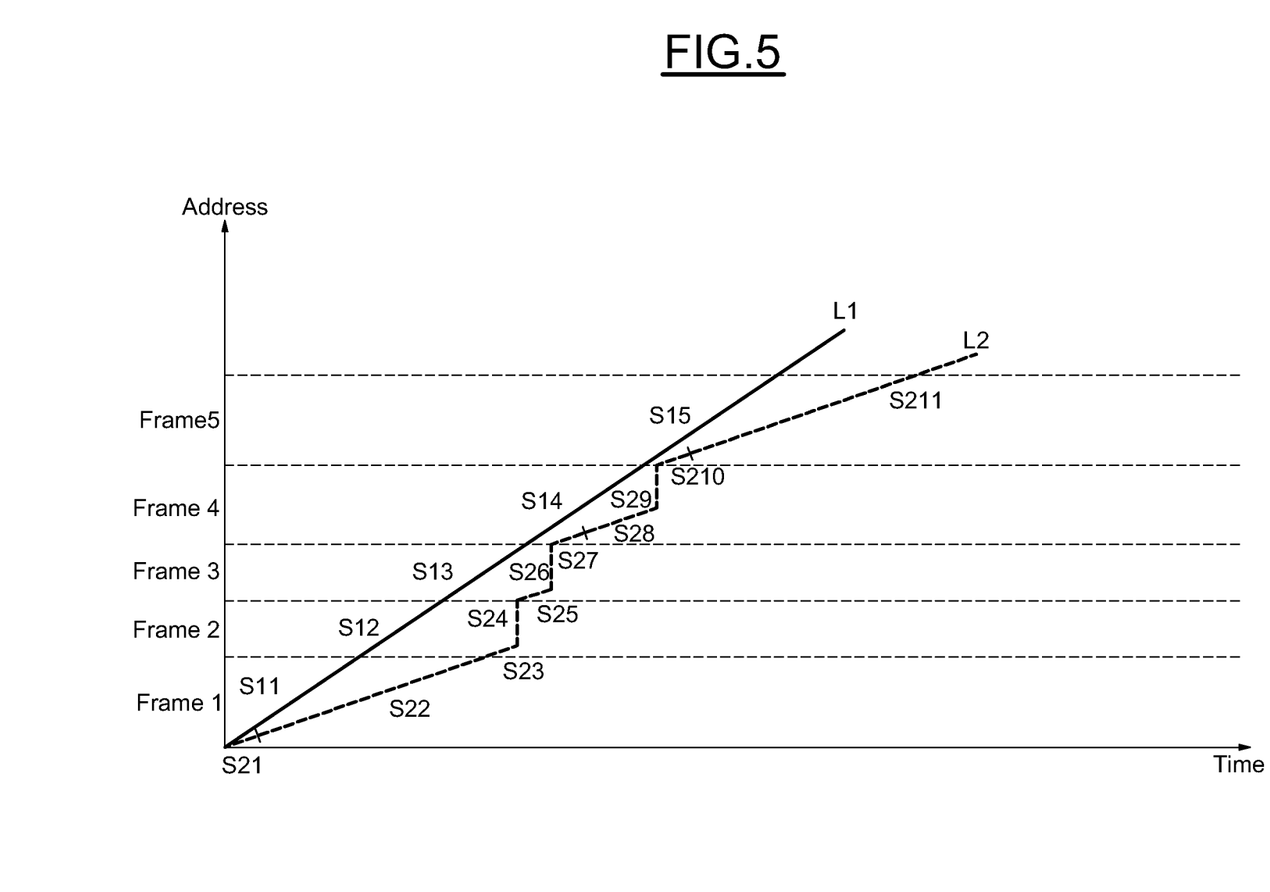
FIG. 5 schematically illustrates the principle of the writing and the reading of the frames in the memory as a function of time, according to the first variant of the invention.

FIG. 5 illustrates the management by the demodulator of the memory MEM for writing all the frames and reading the headers and a part of the frames according to the first variant. FIG. 5 comprises a line L1 and a line L2, consisting of a number of straight segments. The line L1 corresponds to the write, it represents the memory address on the y axis pointed to by the memory write pointer as a function of time on the x axis. The line L2 corresponds to the read, it represents the memory address pointed to on the y axis by the memory read pointer as a function of time on the x axis.

The line L1 comprises 5 segments S11, S12, S13, S14, S15, each corresponding to the writing of the sampled successive frames, respectively Frame 1, Frame 2, Frame 3, Frame 4, and Frame 5. The segments are aligned and adjacent, because all the frames are written following one another and at the same predetermined write frequency (i.e. sampling frequency).

The line L2 comprises 11 segments S21, S22, S23, S24, S25, S26, S27, S28, S29, S210, and S211.

The segment S21 corresponds to the reading of the header of frame 1. As can be seen, the segment S21 is less steep than the segment S11, this representing the fact that the reading of the header is performed at a frequency below the writing frequency (i.e., read frequency equal to working frequency). After it has been read by the header processor PET1, the position of the next frame is also rapidly determined. The header processor PET then determines by counting whether the frame 1 is a wanted frame. If it is, the body of the frame is read as a priority.

In the example illustrated frame 1 is wanted and segment S22 corresponds to the reading of the body of frame 1. Segment 22 is also less steep than segment S11, it has the same slope as segment S21. This represents the fact that the reading of a wanted frame or of the headers is performed at the same reading frequency.

Segment S23 corresponds to the reading of the header of frame 2. Its position is determined by reading the header of the preceding frame. From this read, it is determined by counting whether frame 2 is wanted or not. In the case illustrated, frame 2 is not wanted. Reading of the frame body is not performed and the next read to be performed is that of the next header.

Segment S24 corresponds to an address jump. Frame 2 contains little data, and while its header is being read frame 3 is already being written. It is therefore necessary for the read pointer to be positioned rapidly on the write address to continue with the read. This is performed by an address jump. Segments S25, S26, S27 correspond respectively to the reading of the header of frame 3, to an address jump, and to the reading of the header of frame 4.

Frame 4 is not wanted and is fairly long; although the reading of the header of frame 4 is finished S27, the header of frame 5 is not yet available. To wait for the next header, a "dummy" demodulation of the start of the body of frame 4 can be performed. It is represented by segment S28. As soon as the header of frame 5 is written, the read pointer performs an address jump S29 to read the next frame 5 and its header (respectively S211 and S210). As indicated hereinabove, the demodulation represented by segment S28 is called "dummy" in the sense that the unselected frame will not be processed by the higher layer modules, notably the error correction module FEC. This demodulation provides for a faster convergence of the loops within the demodulator, because in this way they have already been initialised. This demodulation is performed on the unselected frames by the demodulation module MDM when the latter is not in the process of demodulating selected frames.

All of the operations of the demodulation module MDM are preferably performed at the working frequency. For example, 140 MHz is a sufficient speed for the final user bit rate.

In other words, according to this first variant, all the symbol frames are sampled. Then they are stored in the memory (MEM). The frames to be selected are then read and demodulated at a lower working frequency. Thus, the steps performed at a high frequency are generally the writing into memory and the sampling. That said, as specified previously, the writing into memory can be performed at a frequency lower than the sampling frequency by storing a number of samples at a time. It is thus possible to perform the demodulation of the desired channel without implementing so-called critical processing operations, that is to say, operations that require a large number of operations per sample and that use loops whose time constants are very low, at high frequency.

Figure 6:
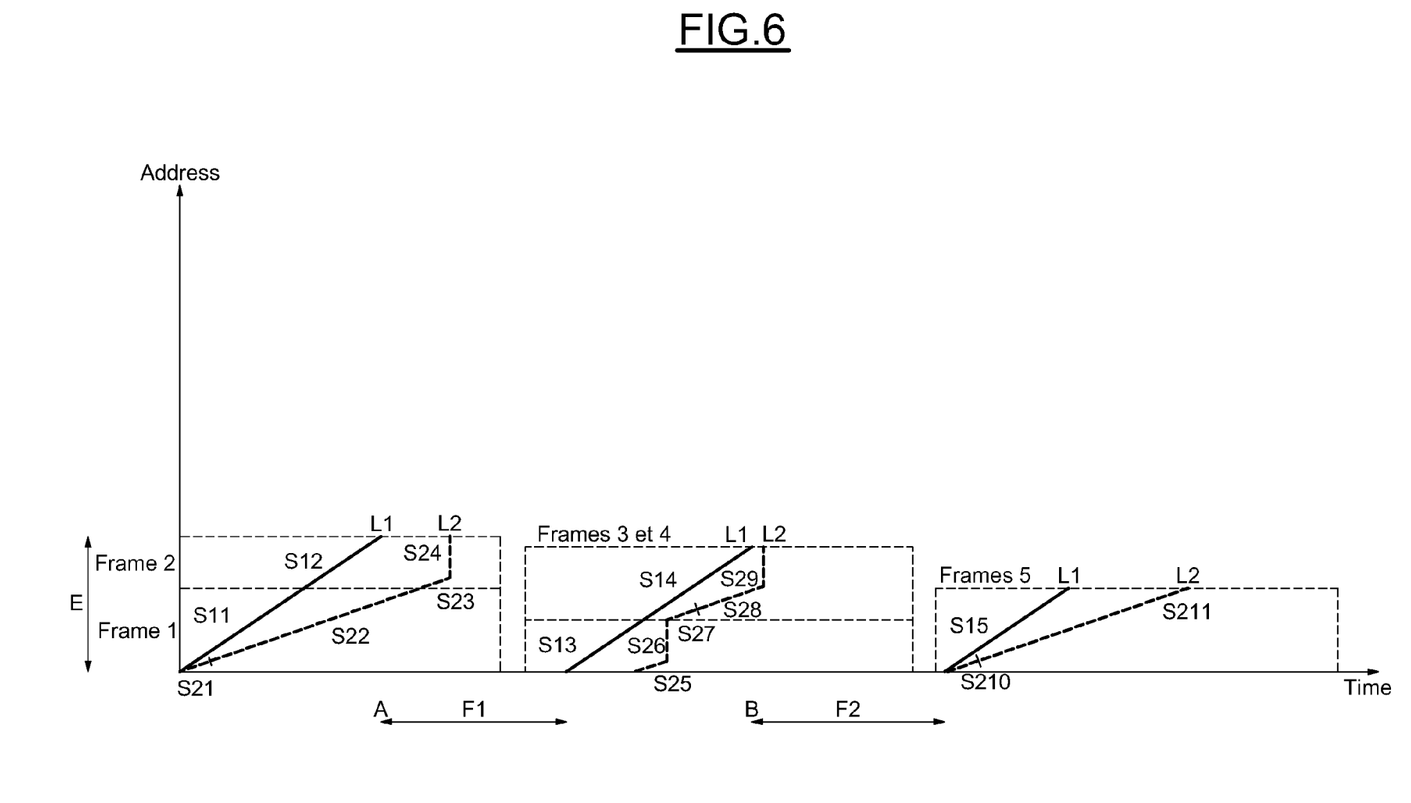
FIG. 6 schematically illustrates the principle of the writing and reading of the frames in the circularly managed memory as a function of time, according to the first variant of the invention.

That said, since all the samples of all the symbols of all the frames must be stored, it is necessary to have a memory of high capacity. One solution for reducing the capacity of such a memory is described hereinbelow (FIG. 6). It comprises a circular management of the memory.

This management corresponds to a rewriting of the locations that have already been used. This rewriting is performed on the frames that have already been read. It is possible because the frames are read only once. FIG. 6 comprises two lines L1 and L2, respectively corresponding to the writing and the reading. The write line L1 comprises segments S11-S15 and the read line comprises segments S21-S211. The write and read segments are identical to those of FIG. 5. They are simply offset to be able to reuse the portion of memory that is no longer used. In the case illustrated, the necessary memory capacity may be reduced to a quantity E corresponding to the sum of the length of the sampled frames 1 and 2. In this figure, for legibility reasons, the three pieces which should partially overlap have been spaced apart. These two spacings are represented by the arrows F1 and F2. A more realistic representation therefore corresponds to a block corresponding to frames 3 and 4 in position A just after the end of the first segment of L1 and to a block corresponding to the frame 5 just after the end of the second segment of L1 in position B.

The frame write as described hereinabove may advantageously be performed in sample packets to enable the storage frequency to be reduced. The storage frequency may be equal to the sampling frequency divided by the number of samples written on each storage operation. In the case of a circularly managed memory, the capacity of the memory is of the order of a frame of maximum length. This circular memory management solution is therefore not always sufficient. In practice, the length of the memory must be at least of the order of the size of the largest of the expected frames, stored in the form of samples. The object of a second variant of the invention is to be able to reduce the size of the memory by storing only the symbols.

Figure 7:
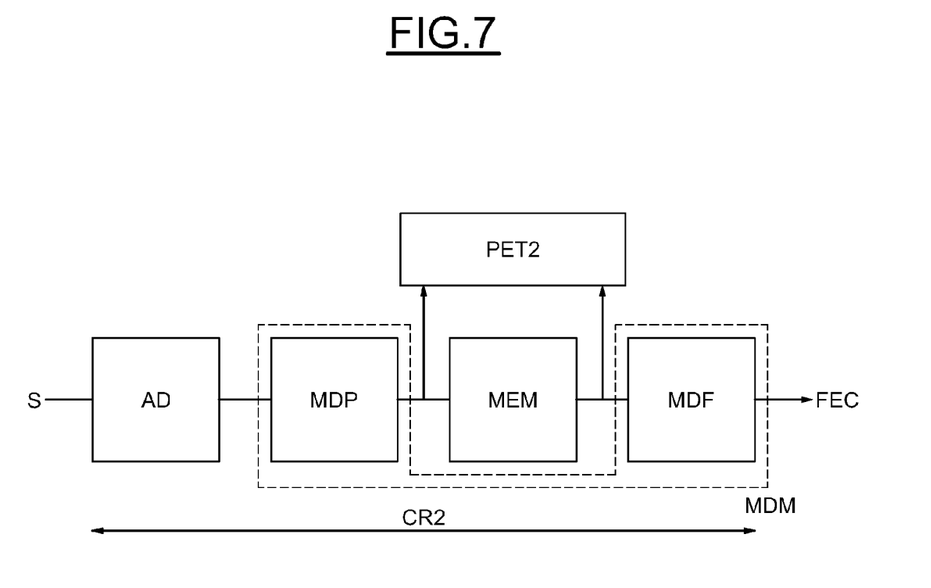
FIG. 7 schematically illustrates a processing subsystem of a demodulator for the signal S, according to a second variant of the invention.

FIG. 7 represents a part CR2 of the processing subsystem of a demodulator according to the second variant of the invention. The processing subsystem CR2 is also capable of processing the received signal S. It can select, from the frames of the signal S, only a part of the frames, for example those corresponding to one channel. It comprises a sampler, AD, a predemodulation module MDP, a memory, MEM, a final demodulation module MDF, a header processor PET2 and demodulation means MDM.

The sampler AD is used to sample the received signal S at a frequency FADC (according to a first example, FADC is equal to three times the symbol frequency and according to another example it is 800 MHz for a symbol frequency of 150 MBaud/s to 400 MBaud/s). As an example, 8 bits are used to digitize the part I of the symbol and 8 bits are used to digitize the part Q of the symbol.

The cooperation of the header processor PET2, of the memory MEM, and of the predemodulation module MDP makes it possible to select the frames that will be stored and demodulated as a priority. At least a part of this selection is performed at the working frequency, that is to say, the operations for determining the frames to be selected, performed by the header processor PET2.

The demodulation means MDM perform the demodulation, at the working frequency (for example 140 MHz), of frames comprising sampled symbols. They comprise the predemodulation module MDP and the final demodulation module MDF. This demodulation comprises a predemodulation processing operation performed by the predemodulation module MDP. This step includes a determination of the symbols based on the samples. The demodulation also comprises a final demodulation processing operation performed on the symbols determined in the predemodulation step. This final processing operation is performed by the final demodulation module MDF.

The first predemodulation module MDP conventionally performs all or some of the following demodulation operations on the sampled symbol frames:
  recovery of the carrier, rough compensation of the carrier frequency;
  continuous offset compensation of the samplers or analogue-digital converters (ADC);
  quadrature compensation;
  balancing equalisation of the gains I and Q;
  change of sampling frequency to extract the symbols;

temporal interpolation of the samples;
determination of the optimum time of the symbol instant;
nyquist filtering which may be combined with the interpolation filter;
calculation of the sampling error;
sampling loop; and
gain loop in the band corresponding to the desired channel.

Thus, at the output of the predemodulation module MDP, the symbols that correspond to the samples are determined. They are in digital form ready to be saved in the memory for the continuation of the processing operation. This predemodulation step is performed on all the frames at the output of the sampler AD at a frequency lower than or equal to the sampling frequency, in particular the working frequency. In practice, this step comprises non-critical predemodulation operations which may be performed at the sampling frequency, or at a frequency lower than the sampling frequency for example by performing these operations in parallel. In the case where parallel operation is used, the frequency at which these predemodulation operations are performed will be, for example, a submultiple of the sampling frequency.

The memory MEM is a conventional memory. It cooperates with the header processor PET2. This cooperation makes it possible to select and store, at a frequency lower than the symbol frequency, at least the wanted frames. This storage may be performed by a simultaneous write of a number of consecutive symbols. This way, the storage frequency is reduced. For example, if K symbols (K being a predetermined integer value) are written at a time, then the storage frequency is equal to the symbol frequency divided by K. The selection, storage and final demodulation are now described in more detail with reference to FIG. 8.

Firstly, initialisation steps 801-809 are performed. During these steps, the header processor PET2 is coupled to the output of the memory MEM. At the output of the predemodulation module MDP, the predemodulated samples, that is to say the symbols, are progressively written (801) into the memory MEM at the address @PE of the write pointer PE. After each write, the write address is incremented (802) to the next position. This address is, for example, initialised to the start of the memory. In the case where the memory is managed circularly, when the pointer PE reaches the maximum address of the memory, the address pointed to @PE is reinitialised to the start of the memory.

In parallel with the write, a read of the symbols stored in the memory MEM is performed at the working frequency. The memory is read (803) by the header processor PET2 at the address @PL of the read pointer PL. This address @PL is, for example, initialised to a random position. Advantageously, after each read, the address PL is incremented (804) to the next position. Provision may also be made after the reading of a certain number of symbols for the address @PL to be once again reinitialised to a random position to avoid, in the case of combinations of frames that always have the same length, a position where there is never a header.

The steps 803 and 804 are performed until a header is determined. The writing of the symbols of the steps 801 and 802 continues after a header is determined (805) with the step 806.

After a first header has been determined (805) by the header processor PET2 and the continuation of the writing of the symbols (806), the header is read at the working frequency (807). The frame length indication is then used by the header processor to determine the position of the following header and whether or not it is present (808) in the memory MEM. In the case where the following header is already present in memory, an address jump (809) is performed to that header. In the case where the following header is not present in memory, it is assumed that the initialisation steps are finished and the steps of the steady state condition are performed.

In other words, during these initialisation steps, all the symbols of the frames, after their predemodulation, are stored in the memory which is, for example, managed circularly. These symbols are read in the memory until a header is determined. When a header is determined, the position of the next header is known by virtue of the frame length information. If the next header is in memory, that is to say, if the symbols at the output of the predemodulation module already correspond to the body of the next frame, the processing operation is once again performed on the symbols in memory so as to avoid jumping a header. If the next header is not yet in memory, then the read performed at the working frequency has caught up on its delay relative to the storage and the steady state condition is established.

In steady state condition, steps 810-814 are performed. During these steps, the header processor PET2 is coupled to the output of the predemodulation module. It reads (810) the header of the following frame at the working frequency. The instant of reception of the headers is known by virtue of the frame length indication read previously (preceding 807 or 810).

For this read, the header processor PET2 uses a small memory which for example stores 90 symbols. This memory may be coupled to the MDP and located between the MDP and the PET2. This memory may also be incorporated in the header processor as is represented in FIG. 7.

The header processor then determines whether the frame currently being demodulated by the demodulator is a selected or unselected frame (811). A frame is selected according to a frame count in the same way as in the first variant. In other words, a sort is performed between the frames so as to determine those which must or must not be selected. This sort is performed at the working frequency according to the count following the header read (810).

A storage is then performed. Although it is theoretically possible only to store in the memory at least the selected frames, an advantageous implementation is proposed that uses a storage of all the data. Given that the memory is chosen to be of a small size (of the order of the size of a frame), there follows, in the case of a storage of all the data in a memory managed circularly, a rewriting over the data already stored. The advantageous implementation therefore comprises a storage of all the data and an inhibition of the storage to avoid the rewriting over the selected frames when they are in the process of being read by the final demodulation module MDF. Thus, the storage is performed continuously.

According to this advantageous implementation, if a demodulation is in progress and if the demodulation relates to a selected frame (811, yes), then the demodulation (814) continues according to the previously positioned read pointer PL. Otherwise, the symbols of the following frame at the output of the predemodulation module MDP are stored in the memory (812). Advantageously, the symbols are stored in symbol packets. This enables the storage frequency to be reduced, the average storage bit rate remaining equal to the symbol bit rate, to be able to write all the symbols.

An address jump (813) is then performed to make the address pointer point to the start of the following frame. The demodulation of the following frame is then begun (814).

In other words, when the current demodulation relates to a selected frame (811, yes), then the storage of the symbols in the memory MEM is inhibited by the header processor PET2. Thus, an overwriting of a selected frame currently being demodulated is avoided. Its demodulation may be finished.

However, the unselected frame stored in memory is overwritten regardless of whether it is currently being demodulated. This makes it possible to limit the size of the memory needed.

Thus, in the case of a series of unselected frames, the demodulator will proceed to demodulate only the frame starts. Upon receipt of a new header, it will proceed with the demodulation of new corresponding frame.

In this variant, a "dummy" demodulation is therefore also performed on a part of some of the unselected frames (the start) by the final demodulation module MDF. These operations are not a priority, they are performed on the unselected frames by the demodulation module MDF when the latter is not in the process of demodulating selected frames.

According to this second variant, the memory capacity is minimized, it may be chosen to be equal to the length of a symbol frame.

The demodulation operations of the final demodulation module MDF referred to previously will now be described. They conventionally comprise all or some of the remaining demodulation operations on the frames read. These operations are:

phase loop, phase recovery;
equalisation; and
decoding and demapping of the symbols (calculation of the probabilities of presence of each bit).

These operations are advantageously performed at the working frequency. The frequency is unimportant, 140 MHz for example.

In other words, according to this second variant, it is proposed to store symbols in a memory that is advantageously managed circularly. These symbols are those of the selected frames but also those of a part of some unselected frames. The storage of symbols makes it possible to have a much lower necessary memory capacity than in the first variant. It does, however, require a premodulation step to be performed before the storage in memory. However, these predemodulation operations are not critical. They can therefore be performed at a frequency below or equal to the sampling frequency, for example by performing them in parallel. The storage is performed at a frequency below the symbol frequency. It is in fact possible to proceed with a write by packets of symbols to reduce the storage frequency while retaining the average symbol bit rate. It is in fact necessary to store with a bit rate equal to that of the symbols to be able to write all the symbols. Then, the reading, the determination of the frames to be selected and the critical demodulation steps are performed at the working frequency, for example 140 MHz.

After the processing operations of the processing subsystem CR1 according to the first variant or CR2 according to the second variant, the demodulated frame is transmitted to the rest of the processing subsystem of the demodulator. The rest of the processing subsystem comprises processing modules well known to those skilled in the art, used to transcribe the demodulated frame into a series of useful binary data. Notable among them is the FEC (Forward Error Correction) function which is situated just after the demodulation module MDM or MDF respectively.

What is claimed is:

1. A method for real-time processing of modulated data transmitted in the form of multiplexed frames containing symbols that have a symbol frequency, comprising:
a frame selection processing operation performed at least partly at a working frequency below the symbol frequency; and
a demodulation processing operation at least in part performed at the working frequency on the selected frames; wherein the symbols are sampled at a sampling frequency and the demodulation of such a frame comprises a predemodulation processing operation including a determination of the symbols based on the samples, and a final demodulation processing operation performed on the symbols and wherein said frame selection processing operation comprises:
performing the predemodulation processing operation on all received frames, each received frame including a header;
determining, at the working frequency, predemodulated frames to be selected, from their respective headers; and
storing at least the selected predemodulated frames in a memory at a storage frequency below the symbol frequency,
and further wherein said demodulation processing operation comprises performing, at the working frequency, the final demodulation processing operation on the selected predemodulated frames.

2. The method according to claim 1, in which determining the predemodulated frames to be selected comprises reading the headers of all the frames at the working frequency.

3. The method according to claim 2, in which, until a first header read has been performed, all the predemodulated frames are stored in the memory at a frequency below the symbol frequency and the memory is read from a random address.

4. The method according to claim 1, also comprising demodulating a part of at least some of the unselected frames.

5. The method according to claim 1, in which the memory is circularly managed.

6. The method according to claim 5, in which storing the selected predemodulated frames comprises a continuous storage of all the symbols of the predemodulated frames and inhibiting said storage each time the final demodulation processing operation is performed on a selected predemodulated frame.

7. A method for real-time processing of modulated data transmitted in the form of multiplexed frames containing symbols that have a symbol frequency, comprising:
a frame selection processing operation performed at least partly at a working frequency below the symbol frequency; and
a demodulation processing operation at least in part performed at the working frequency on the selected frames;
wherein a frame comprises symbols sampled at a sampling frequency and the frame selection processing operation comprises:
storing all the samples of all the frames in a memory;
reading, at the working frequency, respective headers of all the frames so as to obtain said frames to be selected; and
reading, at the working frequency, the selected frames and stored, and
wherein said demodulation processing operation is implemented at the working frequency on the frames read.

8. The method according to claim 7, in which reading the headers and the selected frames comprises reading a predetermined number of samples preceding the frames and headers to be read.

9. The method according to claim 7, in which reading the headers and the selected frames comprises address jumps in said memory.

10. The method according to claim 9, in which the header reading step comprises, for each symbol of the header, determining an optimum instant using a phase locked loop and a digitally-controlled oscillator, said determining an optimum instant including, for each address jump, summing, at a frequency set point accumulated by the digitally-controlled oscillator, the number of samples corresponding to the address jump expressed as a number of symbols.

11. A communication appliance, capable of processing in real time, modulated data transmitted in the form of multiplexed frames containing symbols that have a symbol frequency, comprising:
- a subsystem for processing received frames, said subsystem including:
  - a selector configured to select, at least partly at a working frequency below the symbol frequency, some of the received frames, and
  - a demodulator configured to perform at least a part of a demodulation processing operation at the working frequency on the selected frames;
- wherein a frame comprises symbols sampled at a sampling frequency and a header, the demodulator comprises a predemodulation module configured to perform, on all the frames, a predemodulation processing operation comprising a determination of the symbols from the samples and wherein the selector comprises:
- a header processor configured to determine, at the working frequency, predemodulated frames to be selected from their respective headers; and
- a memory configured to store, at a storage frequency below the symbol frequency, at least the selected predemodulated frames, and
- wherein the demodulator also comprises:
- a final demodulation module configured to perform, at the working frequency, on the predemodulated stored frames, a final demodulation processing operation.

12. The appliance according to claim 11, in which the header processor is configured to read the headers of all the frames at the working frequency.

13. The appliance according to claim 12, in which the header processor is configured to store in the memory, at a storage frequency below the symbol frequency, all the predemodulated frames and to read the memory, at the working frequency, from a random address until a first header has been read.

14. The appliance according to claim 11, in which the demodulator is also configured to perform a demodulation of a part of at least some of the unselected frames.

15. The appliance according to claim 11, in which said memory is a memory with circular management.

16. A communication appliance, capable of processing in real time, modulated data transmitted in the form of multiplexed frames containing symbols that have a symbol frequency, comprising:
- a subsystem for processing received frames, said subsystem including:
  - a selector configured to select, at least partly at a working frequency below the symbol frequency, some of the received frames, and
  - a demodulator configured to perform at least a part of a demodulation processing operation at the working frequency on the selected frames;
- wherein a frame comprises symbols sampled at a sampling frequency, and the selector comprises:
- a memory configured to store all the samples of all the frames; and
- a header processor configured to read, at the working frequency, the headers of all the frames so as to obtain said frames to be selected,
- and wherein the demodulator comprises a demodulation module configured to read the selected frames in the memory at the working frequency and also configured to perform a demodulation processing operation at the working frequency on the frames read.

17. The appliance according to claim 16, in which the header processor and the demodulation module are configured to read a predetermined number of samples preceding the frames and headers to be read.

18. The appliance according to claim 16, in which the header processor and the demodulation module are configured to control a memory read pointer so as to perform address jumps in the memory.

19. The appliance according to claim 18, in which the demodulation module comprises a phase locked loop with a digitally-controlled oscillator and an adder configured to add, for each address jump, at a frequency set point accumulated by the digitally-controlled oscillator, a number equal to the number of samples corresponding to the address jump expressed as a number of symbols.

* * * * *